(12) United States Patent
Bundy et al.

(10) Patent No.: US 6,209,897 B1
(45) Date of Patent: Apr. 3, 2001

(54) APPARATUS AND METHOD FOR MOUNTING A SUSPENSION SYSTEM

(75) Inventors: Robert L. Bundy, Anacortes, WA (US); David L. Stoor, Schaumburg, IL (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/354,420

(22) Filed: Jul. 15, 1999

(51) Int. Cl.$^7$ ................ B60G 11/12; F16F 1/26
(52) U.S. Cl. ................ 280/124.175; 267/260; 267/271
(58) Field of Search ................ 280/680, 686, 280/124.17, 124.175, FOR 156, FOR 175–177, 93.5, 93.507, 93.51; 267/36.1, 260, 263, 266, 271

(56) References Cited

U.S. PATENT DOCUMENTS

| | | | |
|---|---|---|---|
| 1,151,028 | * 8/1915 | McKinley | 267/271 |
| 1,794,899 | * 3/1931 | Hufferd | 267/271 |
| 1,799,880 | * 4/1931 | Arcand et al. | 267/260 |
| 1,801,435 | * 4/1931 | Leighton | 267/271 |
| 1,881,408 | * 10/1932 | Moon | 280/124.174 |
| 2,308,967 | * 1/1943 | Kuss | 280/124.175 |
| 3,887,211 | * 6/1975 | Mazur . | |
| 4,083,545 | * 4/1978 | Herbenar | 280/124.175 |
| 4,103,932 | * 8/1978 | Parker | 267/271 |
| 4,397,478 | 8/1983 | Jensen et al. | 280/711 |
| 4,687,224 | * 8/1987 | Selzer | 280/124.175 |
| 4,718,693 | * 1/1988 | Booher | 280/124.175 |
| 4,995,634 | * 2/1991 | Evans | 280/686 |
| 5,320,192 | * 6/1994 | Hayashida et al. | 280/124.175 |
| 5,354,092 | * 10/1994 | Calvert | 280/124.175 |
| 5,427,404 | 6/1995 | Stephens | 280/712 |
| 5,562,348 | * 10/1996 | Link | 267/271 |
| 5,566,928 | 10/1996 | Lee | 267/31 |
| 5,794,965 | * 8/1998 | Stuker et al. . | |
| 6,007,079 | * 12/1999 | Kincaid et al. | 280/93.51 |

* cited by examiner

Primary Examiner—J. J. Swann
Assistant Examiner—Christopher Bottorff
(74) Attorney, Agent, or Firm—Sidley & Austin (57) ABSTRACT

An assembly for mounting a leaf spring suspension system to a vehicle. The assembly includes an arrangement of a plurality of shackles that movably secure at least a rear portion of a leaf spring, which carries an axle of the vehicle, to a frame of the vehicle.

21 Claims, 5 Drawing Sheets

APPARATUS AND METHOD FOR MOUNTING A SUSPENSION SYSTEM

TECHNICAL FIELD OF THE INVENTION

The present invention relates generally to an apparatus and method for mounting a suspension system. In one aspect, it relates to an apparatus and method for mounting a leaf spring suspension system to the frame of a vehicle.

BACKGROUND OF THE INVENTION

A leaf spring suspension system is a common form of suspension system. Leaf spring suspension systems can be used in many applications, including stationary conveyor systems and many other systems sensitive to mechanical vibrations. However, the most common use of leaf spring suspension systems is for commercial vehicles such as trucks, vans, and other large payload vehicles.

In particular, vehicle suspensions have commonly used leaf spring assemblies to resiliently support the axle relative to the frame and to carry loads on the axle fore and aft to frame-mounted supporting devices. Generally, a leaf spring assembly is pivotally connected at one end to a bracket rigidly mounted on the frame of the vehicle in a manner such that the leaf spring is free to rotate about a fixed pivot relative to the frame when the axle moves vertically. The other end of the leaf spring assembly is connected at another end to a second bracket also rigidly mounted to the frame of the vehicle. However, it is desirable that this connection at the rear end of the leaf spring have a double rotatable configuration (i.e., have two parallel axes of rotation) to help prevent buckling of the leaf spring as the axle moves relative to the frame and deflection of the leaf spring causes the spring to change its horizontal length. As a result, one or more shackles or links are generally used which are pivotally attached at their top ends to the second bracket and are pivotally attached at their bottom ends to the leaf spring. In this manner, the rear end of the leaf spring assembly is still pivotally attached to the axle, but also may still move in the fore and aft directions relative to the frame of the vehicle to help prevent buckling of the leaf spring.

The most common mechanism for mounting a leaf spring suspension system utilizes caps and pinch bolts to secure the spring pins and shackles used. In particular, the front end of a leaf spring assembly is pivotally connected to the front bracket using a spring pin rotatably attached to the front end of the leaf spring and to the front bracket. The spring pin is secured in place using a fitted cap that is attached to one end of the spring pin such that lateral movement of the spring pin relative to the leaf spring and the front bracket is prevented.

The rear end of the leaf spring assembly is connected in a double rotatable configuration to the rear bracket using two spring pins, two shackles, four pinch bolts, and two caps. One spring pin is rotatably attached to the rear end of the leaf spring and one spring pin is rotatably attached to the rear bracket. Each spring pin in the cap and pinch bolt mounting apparatus has a semi-circular groove near both ends of the spring pin, wherein the axis of each semi-circular groove is substantially perpendicular to the longitudinal axis of the spring pin. Two shackles are used wherein each shackle links one end of one spring pin to a corresponding end of the other spring pin. Each shackle has a central body portion and two ends; each end comprises two arms forming a substantially cylindrical hole but the arms do not form a complete cylinder in that the arms do not contact each other at the end farthest from the central body portion. Each end also has a bolt hole passing through both arms in a direction perpendicular to the substantially cylindrical hole such that the diameter of the substantially cylindrical hole can be reduced by threading a bolt through the bolt holes in the arms and tightening the bolt. Additionally, the bolt hole is oriented such that a bolt passing through both arms partially enters the substantially cylindrical hole formed by the arms. When assembled, a spring pin is aligned through the substantially cylindrical hole formed by the arms of the shackle such that a bolt threaded through the bolt hole in the arms of the shackle is aligned with the semi-circular groove near the end of the spring pin, and the bolt is tightened to form an interference fit between the spring pin and the shackle. In this manner, the spring is prevented from rotating relative to the shackle and is prevented from moving laterally relative to the shackle. In applications using this type of mounting apparatus, each shackle requires this assembly to be performed two separate times. Because two shackles are used to mount the leaf spring suspension system, one on each side of the leaf spring and the rear bracket, this assembly must be performed four times with four different bolts. Finally, a cap is placed on the end of each spring pin to further secure the spring pins in place.

Although the cap and pinch bolt apparatus for mounting a leaf spring suspension system does secure the suspension system to the frame, it is difficult and costly to utilize such an apparatus because of the amount of parts necessary for mounting the suspension. A mounting apparatus that utilizes fewer parts would be provide the following advantages: lower cost, simpler and easier installation and maintenance, lower weight, and a decreased probability of failure. For obvious reasons, fewer parts results in lower cost, simpler and easier installation and maintenance, and lower weight. Additionally, the probability of failure of an apparatus having fewer parts is statistically reduced. Therefore, a need exists to improve upon the cap and pinch bolt apparatus by reducing the number of parts necessary to mount a leaf spring suspension system.

SUMMARY OF THE INVENTION

An apparatus and method is provided for mounting a leaf spring suspension system to a structure using fewer parts than the prior art. Specifically, the mounting apparatus and method of the current invention can be used for many vehicle applications, but is particularly suited for use in commercial trucks, vans, and other large vehicles intended to carry large payloads. The mounting apparatus includes a spring pin and two fastening bolts for mounting one end of the leaf spring suspension system, and includes two spring pins, two shackles, and two fastening bolts for mounting the other end of the leaf spring suspension system. Each end of the leaf spring suspension system is attached to the frame of the vehicle (or to a bracket rigidly attached to the frame). In the preferred embodiment, each spring pin has a cylindrical center portion and two flattened ends located symmetrically about the cylindrical center portion, wherein each flattened end has a transverse cylindrical hole passing through it. Also in the preferred embodiment, each shackle has a central body portion and two U-shaped ends symmetrical about the central body portion, wherein each U-shaped end has an open-ended portion that is directed away from the central body portion of the shackle. Additionally, a cylindrical hole passes from the open-ended portion of one U-shaped end, through a longitudinal axis of the central body portion, and through the open-ended portion of the other U-shaped end.

In the preferred embodiment, one end of the leaf spring is rotatably attached to a bracket on the frame of the vehicle using only a spring pin and two fastening bolts. The spring pin is rotatably secured to the end of the leaf spring such that the flattened ends of the spring pin make contact with the bracket and a fastening bolt secures each flattened end to the bracket. The other end of the leaf spring is attached to another bracket on the frame of the vehicle in a double rotatable configuration using only two spring pins, two shackles, and two fastening bolts. One spring pin is rotatably secured to the end of the leaf spring and the other spring pin is rotatably secured to the bracket such that the flattened ends of both spring pins extend beyond both sides of the leaf spring and the bracket, respectively. One shackle is oriented such that one flattened end of the spring pin attached to the end of the leaf spring is seated in one of the U-shaped open ends of the shackle and a corresponding flattened end of the spring pin attached to the bracket is seated in the other U-shaped open end of the shackle. Similarly, the second shackle also seats corresponding flattened ends of these two spring pins. When assembled, the cylindrical transverse holes through the flattened ends of these two spring pins and the cylindrical holes in the shackles are aligned such that one fastening bolt secures the first shackle to the corresponding flattened ends of the spring pins and a second fastening bolt secures the second shackle to the other corresponding flattened ends of the spring pins.

In one embodiment, one spring pin is rotatably secured to each end of the leaf spring by forming a substantially circular loop in each end of the leaf spring and aligning a spring pin inside each looped end. Alternatively, the spring pins can be rotatably secured to each end of the leaf spring using other embodiments. For example, a U-shaped bolt or other U-shaped attachment member can be connected to the leaf spring such that the spring pin is encircled and thereby rotatably secured.

In yet another embodiment, the preferred U-shaped open ends of the shackles can be replaced as long as a single fastening bolt can still be used to fasten a single shackle to two spring pins. For example, the preferred U-shaped open ends can be replaced with square-shaped ends that encircle the spring pin. In this alternative embodiment, the cylindrical hole through the shackle also continues through the outer walls of the square-shaped ends such that a fastening bolt can pass through the entire length of the shackle. In still another alternative embodiment, the preferred U-shaped open ends can be replaced with O-shaped ends that encircle the spring pin. In this alternative embodiment, the spring pins can have cylindrical ends rather than flattened ends (but still have cylindrical transverse holes therethrough) so that the circumference of the cylindrical ends of the spring pins make uniform contact with the interior of the O-shaped ends of the shackle. Furthermore, it is preferred in this alternative embodiment that the O-shaped ends have a countersink encircling the cylindrical hole so that the head of the fastening bolt makes uniform contact with the surface of the O-shaped ends.

BRIEF DESCRIPTION OF THE DRAWINGS

A better and more complete understanding of the present invention and the advantages thereof will be gained from the following detailed description, claims, and accompanying drawings in which:

DETAILED DESCRIPTION

With reference to the accompanying FIGS. 1–12, wherein like reference numerals designate like or corresponding parts throughout the several views, the present invention is explained hereafter.

Figure 1:
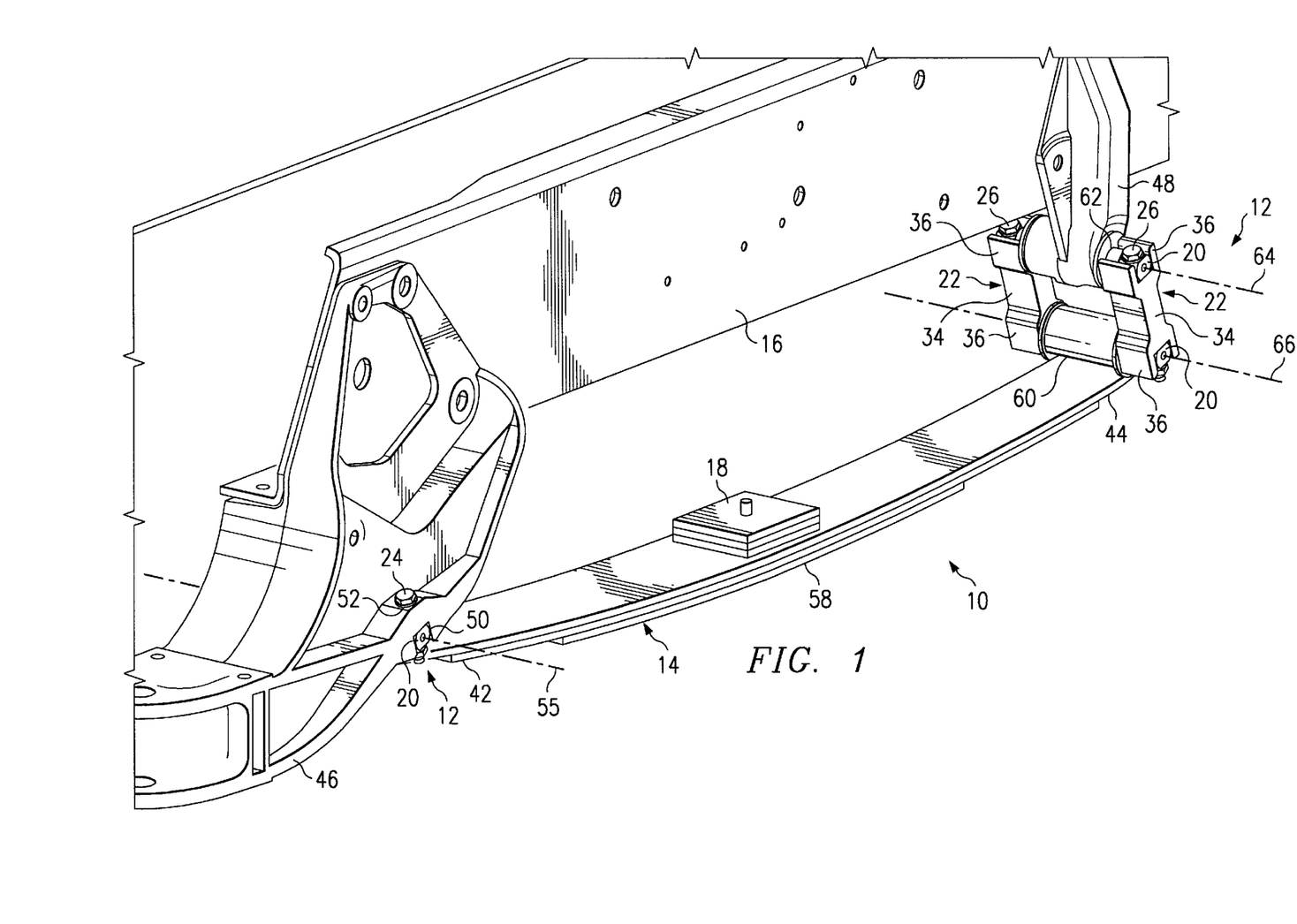
FIG. 1 is a perspective view of a fully assembled leaf spring suspension system utilizing a mounting apparatus for a suspension system according to the present invention.

FIG. 1 illustrates a fully assembled leaf spring suspension system 10 utilizing the mounting apparatus 12 of the current invention. Although mounting apparatus 12 can be used for mounting a leaf spring suspension system 10 to any type of structure utilizing such a suspension, the preferred embodiment of this invention will be described in the context of a heavy-duty, large payload wheeled vehicle. It is important to note, however, that other applications such as stationary conveyor systems or any other apparatus utilizing a leaf spring suspension system can benefit from using the mounting apparatus 12 of the current invention.

In the preferred embodiment shown in FIG. 1, leaf spring suspension system 10 includes a leaf spring 14 attached to the frame 16 of a vehicle. Leaf spring 14 has an axle/dampener attachment point 18 near its center, which is used to attach leaf spring 14 to an axle (not shown) and a dampening mechanism (not shown). Leaf spring 14 allows the frame 16 to move relative to the axle and the ground when the vehicle is driven over irregular terrain or when a load is placed on frame 16. The dampening mechanism provides a dampening force to the vibration of leaf spring 14, thus returning the axle and frame 16 back to an equilibrium position relative to one another. Because of the large forces that are exerted on leaf spring 14 by this relative motion between frame 16 and the axle, a mounting between leaf spring 14 and frame 16 is necessary that is strong and durable yet also provides flexibility such that leaf spring 14 will not buckle under the large deflecting force to which it is subjected. The mounting apparatus 12 of the current invention simply and effectively provides such qualities.

Figure 2:
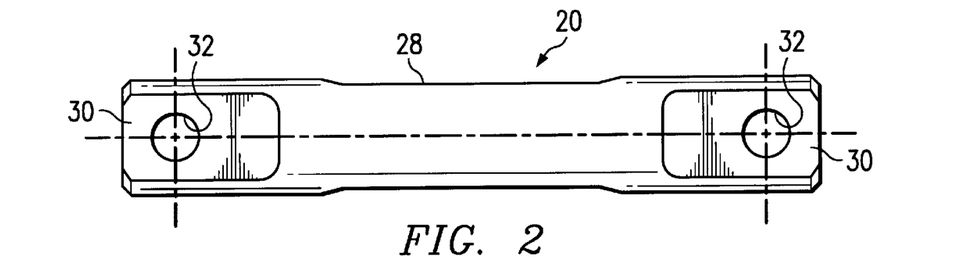
FIG. 2 is a plan view of a spring pin according to the present invention.
Figure 3:
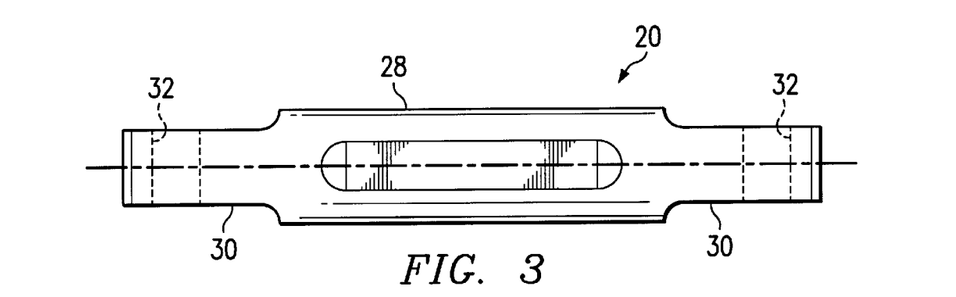
FIG. 3 is a side elevational view of the spring pin depicted in FIG. 2.
Figure 4:
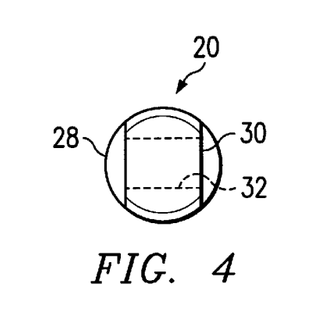
FIG. 4 is an end elevational view of the spring pin depicted in FIG. 2.
Figure 5:
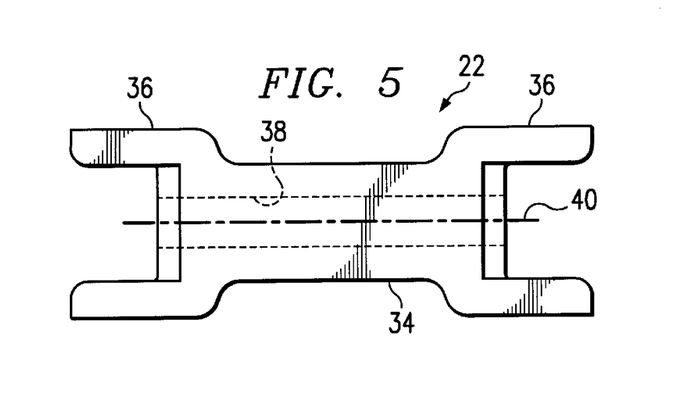
FIG. 5 is a plan view of a shackle according to the present invention.
Figure 6:
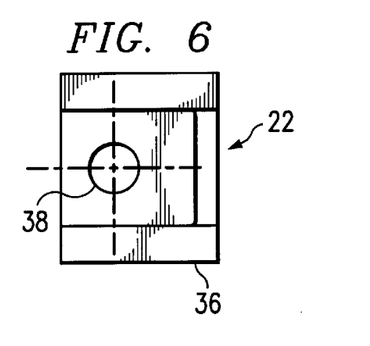
FIG. 6 is an elevational view of one U-shaped end of the shackle depicted in FIG. 4 and the cylindrical hole passing through a longitudinal axis of the shackle.

The hardware used in mounting apparatus 12 for mounting leaf spring suspension system 10 to frame 16 includes three spring pins 20, two shackles (or links) 22, two front fastening bolts 24, and two rear fastening bolts 26. As best illustrated in FIGS. 2–4, each spring pin 20 generally comprises a cylindrical center portion 28 and two flattened ends 30 symmetrical about center portion 28 Each flattened end 30 has a transverse hole 32 to accommodate a front fastening bolt 24. As best illustrated in FIGS. 5–6, each shackle (or link) 22 comprises a central body portion 34 and two U-shaped open ends 36 symmetrical about body portion 34. A cylindrical hole 38 passes from one U-shaped open end 36, through a longitudinal axis 40 along central body portion 34, and to the second U-shaped open end 36, such that a rear fastening bolt 26 can pass through the length of shackle 22.

Figure 7:
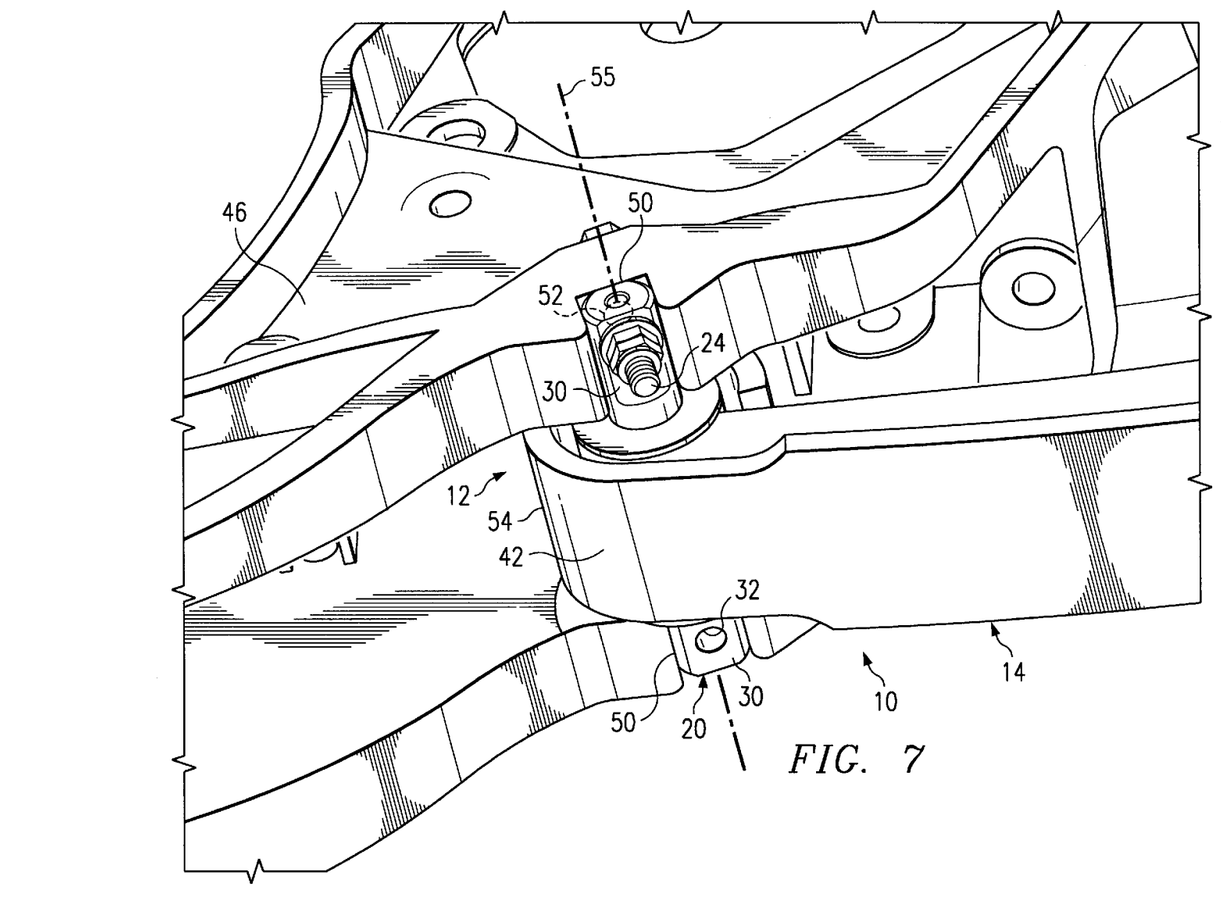
FIG. 7 is an enlarged bottom perspective view of the front of the fully assembled leaf spring suspension system depicted in FIG. 1.

As shown in FIG. 1, leaf spring 14 has a front end 42 and a rear end 44, each of which is securely attached to frame 16 using mounting apparatus 12. In a preferred embodiment, a front bracket 46 and a rear bracket 48 are rigidly attached to frame 16 and the front and rear ends 42, 44 of leaf spring 14 are attached to the front and rear brackets 46, 48, respectively. As can be seen in FIG. 7, front bracket 46 is a rigid structure having two connection points 50 for connecting the front end 42 of leaf spring 14 through the use of mounting apparatus 12. Each connection point 50 on front bracket 46 has a cylindrical hole 52 for accommodating a front fastening bolt 24 (shown in FIGS. 1 and 7 with a fastening bolt 24 already inserted therethrough). The front end 42 of leaf spring 14 is capable of rotatably securing a spring pin 20 such that the longitudinal axis of spring pin 20 is substantially coplanar with leaf spring 14 and is substantially perpendicular to the length of leaf spring 14. In a preferred embodiment as best shown in FIG. 7, the front end 42 of leaf spring 14 forms a loop 54 such that spring pin 20 can be aligned within looped front end 54 and the flattened ends 30 of spring pin 20 extend beyond the width of leaf spring 14, thereby creating an axis of rotation 55 through looped front end 54. The flattened ends 30 of spring pin 20 are placed in contact with the corresponding connection points 50 on front bracket 46 in an orientation such that the transverse hole 32 through each flattened end 30 is aligned with the corresponding cylindrical hole 52 through each connection point 50. In the preferred embodiment shown in FIG. 7, it can be seen that each connection point 50 comprises a U-shaped notch in front bracket 46 to aid in seating and securing the flattened ends 30 of spring pin 20 to connection points 50. Once properly aligned, one front fastening bolt 24 is threaded through each flattened end 30 and the corresponding connection point 50 and fastened with a nut, thereby rotatably securing the front end 42 of leaf spring 14 to front bracket 46 using only a single spring pin 20 and two front fastening bolts 24.

Figure 8:
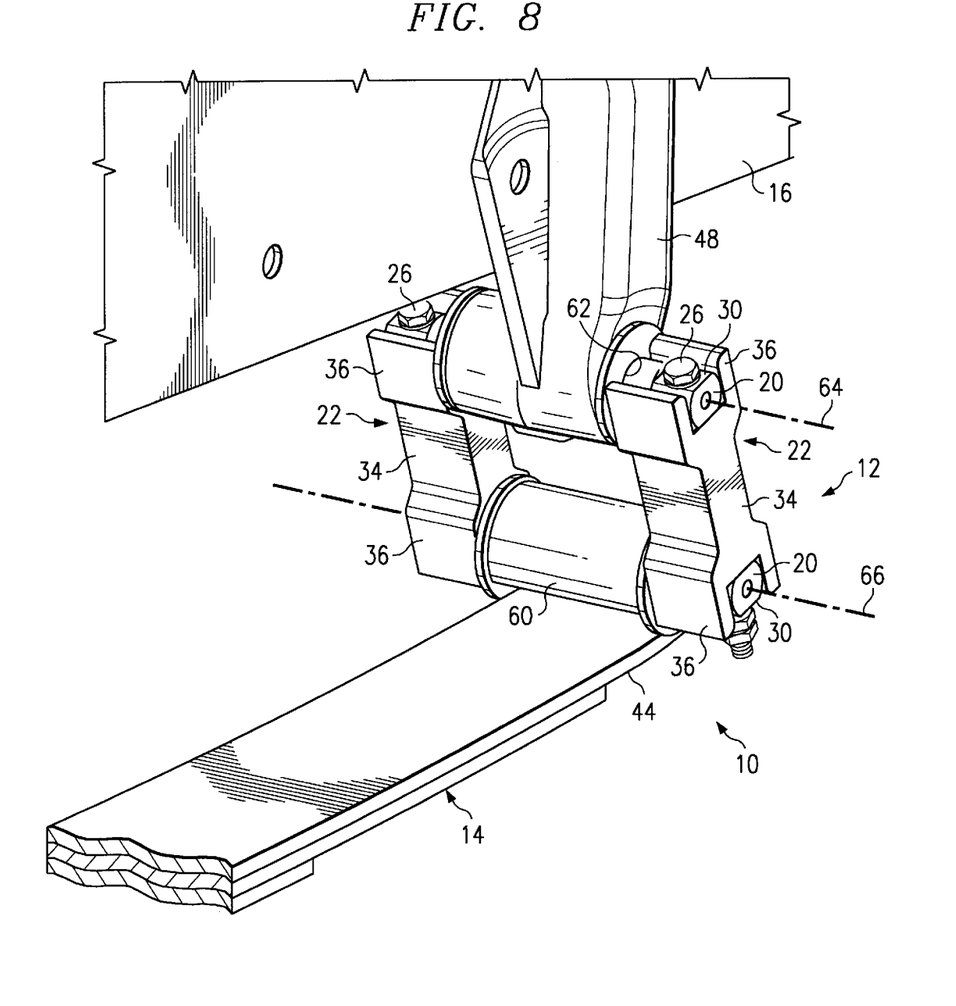
FIG. 8 is an enlarged side perspective view of the rear of the fully assembled leaf spring suspension system depicted in FIG. 1.

Referring now to FIG. 8, shown is the mounting apparatus for rotatably securing the rear end 44 of leaf spring 14 to rear bracket 48. Specifically, in this application a double rotatable connection (or a floating connection) is used to reduce the risk of buckling of leaf spring 14. With a double rotatable connection, in addition to allowing rotation of the rear end 44 of leaf spring 14 relative to rear bracket 48, the rear end 44 is also allowed to move laterally relative to rear bracket 48 (i.e., closer to or further from front bracket 46) to compensate for deflection of the center portion 58 of leaf spring 14. Generally speaking, a double rotatable connection means that the rear end 44 of leaf spring 14 is provided with two parallel axes of rotation. As with the front end 42 of leaf spring 14, the rear end 44 is also capable of rotatably securing a spring pin 20 such that the longitudinal axis of spring pin 20 is substantially coplanar with leaf spring 14 and is substantially perpendicular to the length of leaf spring 14. In a preferred embodiment, the rear end 44 of leaf spring 14 forms a loop 60 such that spring pin 20 can be aligned within looped rear end 60 and the flattened ends 30 of spring pin 20 extend beyond the width of leaf spring 14. Rear bracket 48 is also capable of rotatably securing another spring pin 20 such that the length of spring pin 20 is substantially coplanar with leaf spring 14 and is substantially perpendicular to the length of leaf spring 14, i.e., rotatably secures a spring pin 20 with an axis of rotation 64 parallel to the axis of rotation 66 of the rotatable attachment to the rear end 44 of leaf spring 14. In the preferred embodiment shown in FIG. 8, rear bracket 48 has a cylindrical hole 62 having an axis 64 parallel to the axis 66 of looped rear end 60 (cylindrical hole 62 shown in FIGS. 1 and 8 with spring pin 20 already inserted therethrough). By providing looped rear end 60 and the cylindrical hole 62 through rear bracket 48, the two parallel axes of rotation 64, 66 necessary for a double rotatable connection of the rear end 44 of leaf spring 14 to rear bracket 48 are created.

For the physical connection between the parallel axes of rotation 64, 66 of the rear end 44 of leaf spring 14, the mounting hardware comprises two spring pins 20, two shackles 22, and two rear fastening bolts 26. One spring pin 20 is aligned within looped rear end 60 such that the flattened ends 30 of spring pin 20 extend beyond the width of leaf spring 14. Another spring pin 20 is aligned with the cylindrical hole 62 through rear bracket 48 such that the flattened ends 30 of spring pin 20 extend beyond the width of rear bracket 48. As can be seen in FIG. 8, one shackle 22 is located on each side of leaf spring 14 and rear bracket 48. Specifically, each shackle 22 is oriented such that the top U-shaped open end 36 of shackle 22 seats a flattened end 30 of spring pin 20 aligned in cylindrical hole 62 and the bottom U-shaped open end 36 of shackle 22 seats a corresponding flattened end 30 of spring pin 20 aligned in looped rear end 60. In this arrangement, the transverse holes 32 through the corresponding flattened ends 30 of spring pins 20 seated on shackle 22 are aligned with the cylindrical hole 38 through shackle 22. For each shackle 22, one rear fastening bolt 26 is threaded through the transverse hole 32 through flattened end 30 of spring pin 20 seated on the top U-shaped open end 36 of shackle 22, through the cylindrical hole 38 through shackle 22, and through the transverse hole 32 through flattened end 30 of spring pin 20 seated on the bottom U-shaped open end 36 of shackle 22. Each rear fastening bolt 26 is then fastened with a nut, thereby physically connecting the two parallel axes of rotation 64, 66 and rotatably securing the rear end 44 of leaf spring 14 to rear bracket 48 in a double rotatable configuration that allows rotation and lateral movement of the rear end 44 of leaf spring 14 relative to rear bracket 48.

Figure 9:
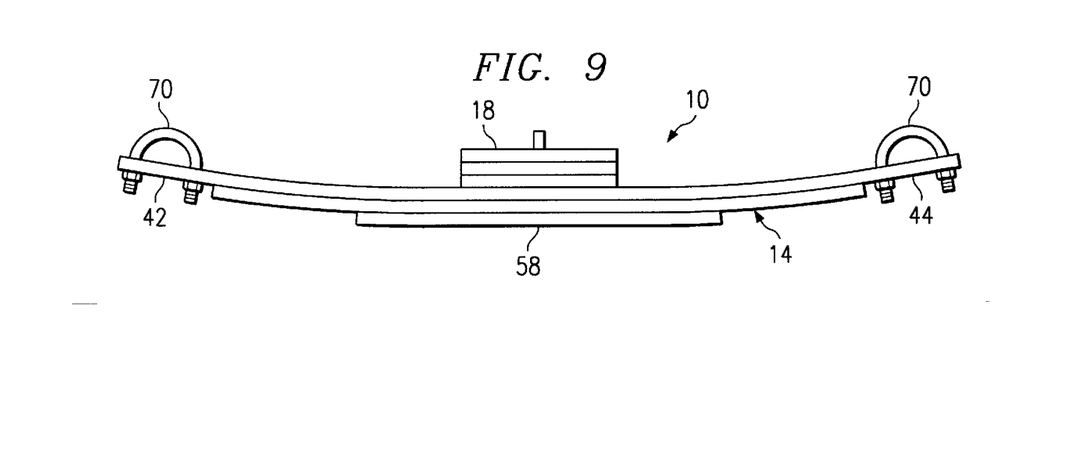
FIG. 9 is an elevational view of an alternative embodiment for rotatably securing a leaf spring to the front and rear brackets, using U-shaped attachment members.
Figure 10:
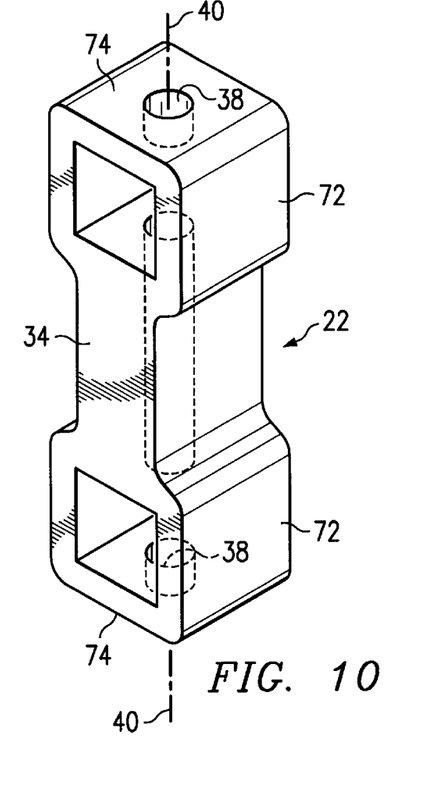
FIG. 10 is a perspective view of a shackle having square-shaped ends according to an alternative embodiment of the current invention.
Figure 11:
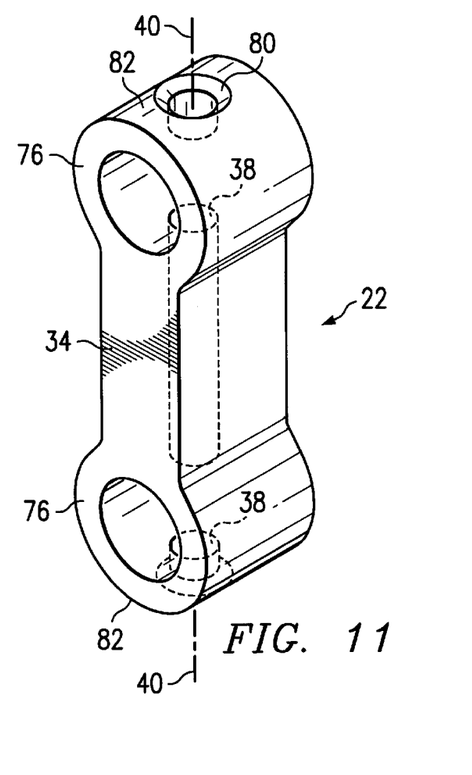
FIG. 11 is a perspective view of a shackle having O-shaped ends according to an alternative embodiment of the current invention.
Figure 12:
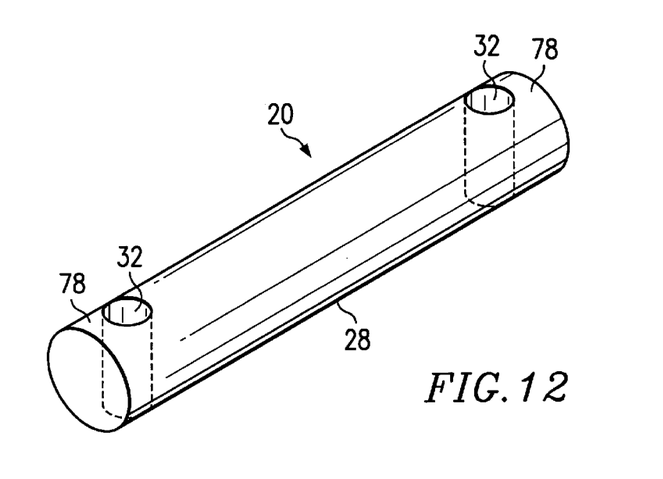
FIG. 12 is a perspective view of a spring pin for use with the shackle depicted in FIG. 11 having O-shaped ends according to an alternative embodiment of the current invention.

It will be appreciated that variations from this preferred embodiment are within the scope of the current invention. For example, the mechanism for rotatably securing spring pin 20 to the front end 42 of leaf spring 14 and the rear end 44 of leaf spring 14 may vary. Specifically, as shown in FIG. 9, this rotatable attachment can be created by connecting a U-shaped attachment member 70 to both ends 42, 44 of leaf spring 14 that can encircle spring pins 20, thereby rotatably securing leaf spring 14 to spring pins 20. Any other mechanism for rotatably securing spring pin 20 can also be used without departing from the scope of the current invention. As another example, shackle 22 can be embodied differently as long as a solid link that can be connected with a single rear fastening bolt 26 is provided. Specifically, as shown in FIG. 10, shackle 22 could have two square-shaped ends 72 rather than the U-shaped open ends 36 of the preferred embodiment. In this alternative embodiment, the cylindrical hole 38 through shackle 22 extends through the outer walls 74 of square-shaped ends 72 and the flattened ends 30 of spring pins 20 fit inside square-shaped ends 72. In this manner, mounting apparatus can be secured by threading rear fastening bolt 26 through the outer wall 74 of one square-shaped end 72, through the flattened end 30 of a first spring pin 20, through the central body portion 34 of shackle 22, through the flattened end 30 of a second spring pin 20, and through the outer wall 74 of a second square-shaped end 72. Similarly, as shown in FIG. 11, shackle 22 can have two O-shaped ends 76 rather than the U-shaped open ends 36 of the preferred embodiment. In this alternative embodiment, it is preferred that cylindrical hole 38 through shackle 22 have a countersink 80 surrounding cylindrical hole 38 at the outer walls 82 of the O-shaped ends 76 such that the head of rear fastening bolt 26 makes contact with a flat surface. As illustrated in FIG. 12, in order that spring pins 20 fit snugly within the O-shaped ends 76 of shackle 22, spring pins 20 can have cylindrical ends 78 that still have transverse holes 32 through which rear fastening bolt 26 is threaded.

The current invention also encompasses a method of mounting a suspension system to a frame 16 wherein the frame 16 will likely be subjected to mechanical vibrations during use. As best illustrated in FIG. 1, the components to be attached using this method are a front bracket 46, a rear bracket 48, and a leaf spring 14 with a front end 42 and a rear end 44. To mount the leaf spring 14 to the front bracket 46 and the rear bracket 48, this method uses three spring pins 20, two shackles 22, two front fasteners 24, and two rear fasteners 26, each of which has been described above. As shown in FIG. 7, the front end 42 of the leaf spring 14 is rotatably attached to the front bracket 46 by rotatably mounting one spring pin 20 to the front end 42 of the leaf spring 14 and then securing the opposite ends of this spring pin 20 to the front bracket 46 using the two front fasteners 24. As shown in FIG. 8, the rear end 44 of the leaf spring 14 is rotatably attached to the rear bracket 48 in a double rotatable configuration (i.e., a connection that has two parallel axes of rotation). This double rotatable configuration is achieved by creating two rotatable connections, one at the rear end 44 of the leaf spring 14 and another at the rear bracket 48, and linking the two rotatable connections using two shackles 22. The first rotatable connection is established by rotatably mounting a second spring pin 20 to the rear end 44 of the leaf spring 14 and the second rotatable connection is established by rotatably mounting a third spring pin 20 to the rear bracket 48. The two rotatable connections are linked by linking a first end of the second spring pin 20 to a corresponding first end of the third spring pin 20 using a first shackle 22 and by linking the second end of the second spring pin 20 to a corresponding second end of the third spring pin 20 using a second shackle 22. These links are then secured by using a first rear fastener 26 to fasten the first end of the second spring pin 20, the corresponding first end of the third spring pin 20, and the first shackle 22, and by using a second rear fastener 26 to fasten the second end of the second spring pin 20, the corresponding second end of the third spring pin 20, and the second shackle 22.

In a preferred embodiment of the method of this invention that is best illustrated in FIGS. 7 and 8, the spring pins 20 and the shackles 22 are linked in a particular manner. Specifically, each of the two spring pins 20 includes two ends 30, wherein each end has a transverse hole 32 passing through the diameter of the spring pin 20, and each shackle 22 includes a cylindrical hole 38 passing along its longitudinal axis 40. The link between the spring pins 20 and the shackles 22 are thus secured using these transverse holes 32 and cylindrical holes 38. In particular, the first end of the second spring pin 20 and the corresponding first end of the third spring pin 20 are secured to the first shackle 22 by inserting a rear fastener 26 through the cylindrical hole 38 along the longitudinal axis 40 of the first shackle 22 and through the aligned transverse holes 32 through the second spring pin 20 and the third spring pin 20. The second end of the second spring pin 20 and the corresponding second end of the third spring pin 20 are secured to the second shackle 22 by inserting a rear fastener 26 through the cylindrical hole 38 along the longitudinal axis 40 of the second shackle 22 and through the aligned transverse holes 32 through the second spring pin 20 and the third spring pin 20.

Finally, it should be readily apparent that the method of this invention is not limited to any particular order. For example, the method disclosed and claimed herein is equally advantageous regardless of which end of the leaf spring 14 is attached first, regardless of which shackle 22 is attached first, and regardless of which spring pin 20 is attached first. As a result, the order in which this method is described should not be considered a limitation to the scope of this invention.

Having thus described in detail a preferred selection of embodiments of the present invention, it is to be appreciated and will be apparent to those skilled in the art that many physical changes could be made in the apparatus without altering the inventive concepts and principles embodied therein.

We claim:

1. An apparatus for rotatably attaching one end of a leaf spring to a suspension bracket, the apparatus comprising:

first and second spring pins, each of the spring pins having two ends, and each of the ends having a transverse hole therethrough;

first and second shackles, each of the shackles having a cylindrical hole along a longitudinal axis;

the first spring pin is rotatably mountable to a leaf spring and the second spring pin is rotatably mountable to a suspension bracket;

the first shackle is adapted to be oriented on a first side of the leaf spring and between the ends of the first spring pin and the second spring pin extending beyond the first side of the leaf spring;

the second shackle is adapted to be oriented on a second side of the leaf spring and between the ends of the first spring pin and the second spring pin extending beyond the second side of the leaf spring; and first and second fastening members, the first fastening member being mountable through the cylindrical hole along the longitudinal axis of the first shackle and securable to the ends of the first spring pin and the second spring pin extending beyond the first side of the leaf spring, and the second fastening member being mountable through the cylindrical hole along the longitudinal axis of the second shackle and securable to the ends of the first spring pin and the second spring pin extending beyond the second side of the leaf spring.

2. An apparatus for rotatably attaching one end of a leaf spring to a suspension bracket in accordance with claim 1, wherein the two ends of each spring pin are flattened.

3. An apparatus for rotatably attaching one end of a leaf spring to a suspension bracket in accordance with claim 1, wherein each shackle has a central body portion and two seating portions on opposite ends of the central body portion and the cylindrical hole along the longitudinal axis of each shackle passes through the central body portion and the two seating portions.

4. An apparatus for rotatably attaching one end of a leaf spring to a suspension bracket in accordance with claim 3, wherein the seating portions of each shackle form U-shaped open ends with the open portions of each U-shaped open end directed away from the central body portion.

5. An apparatus for rotatably attaching one end of a leaf spring to a suspension bracket in accordance with claim 3, wherein the seating portions of each shackle form O-shaped ends.

6. An apparatus for rotatably attaching one end of a leaf spring to a suspension bracket in accordance with claim 3, wherein the seating portions of each shackle form square-shaped ends.

7. An apparatus for rotatably attaching one end of a leaf spring to a suspension bracket, the apparatus comprising:
- a first spring pin and a second spring pin, each spring pin having two ends, and each end having a transverse hole therethrough;
- a first shackle and a second shackle, each shackle having a central body portion, two seating portions on opposite ends of the central body portion, and a cylindrical hole along a longitudinal axis passing through the central body portion and each seating portion of the shackle;
- the first spring pin is rotatably mountable to a leaf spring such that the ends of the first spring pin extend beyond opposing sides of the leaf spring;
- the second spring pin is rotatably mountable to a suspension bracket such that the ends of the second spring pin extend beyond opposing sides of the suspension bracket;
- the first shackle is adapted to be oriented between the first spring pin and the second spring pin, wherein when in an assembled state, the end of the first spring pin that extends beyond a first side of the leaf spring is seated in the seating portion at one end of the first shackle and the end of the second spring pin that extends beyond a corresponding side of the suspension bracket is seated in the seating portion at the other end of the first shackle;
- the second shackle is adapted to be oriented between the first spring pin and the second spring pin, wherein when in the assembled state, the end of the first spring pin that extends beyond a second side of the leaf spring is seated in the seating portion at one end of the second shackle and the end of the second spring pin that extends beyond a corresponding side of the suspension bracket is seated in the seating portion at the other end of the second shackle; and
- at least two fastening members, each fastening member mounted through the cylindrical hole passing through the longitudinal axis of a corresponding shackle, wherein each fastening member secures the first spring pin and the second spring pin to the corresponding shackle.

8. An apparatus for rotatably attaching one end of a leaf spring to a suspension bracket in accordance with claim 7, wherein the two ends of each spring pin are flattened.

9. An apparatus for rotatably attaching one end of a leaf spring to a suspension bracket in accordance with claim 7, wherein the seating portions of each shackle form U-shaped open ends with the open portions of each U-shaped open end directed away from the central body portion.

10. An apparatus for rotatably attaching one end of a leaf spring to a suspension bracket in accordance with claim 7, wherein the seating portions of each shackle form O-shaped ends.

11. An apparatus for rotatably attaching one end of a leaf spring to a suspension bracket in accordance with claim 7, wherein the seating portions of each shackle form square-shaped ends.

12. An apparatus for rotatably attaching one end of a leaf spring to a suspension bracket, the apparatus comprising:
- a first spring pin and a second spring pin, each spring pin having a cylindrical center portion and two flattened ends symmetrical about the cylindrical center portion, each flattened end having a transverse hole therethrough;
- a first shackle and a second shackle, each shackle having a central body portion, two seating portions on opposite ends of the central body portion, and a cylindrical hole along a longitudinal axis passing through the central body portion and each seating portion of the shackle;
- the first spring pin is rotatably mountable to a leaf spring such that the flattened ends of the first spring pin extend beyond opposing sides of the leaf spring;
- the second spring pin is rotatably mountable to a suspension bracket such that the flattened ends of the second spring pin extend beyond opposing sides of the suspension bracket;
- the first shackle is adapted to be oriented between the first spring pin and the second spring pin, wherein when in an assembled state, the flattened end of the first spring pin that extends beyond a first side of the leaf spring is seated in the seating portion at one end of the first shackle and the flattened end of the second spring pin that extends beyond a corresponding side of the suspension bracket is seated in the seating portion at the other end of the first shackle;
- the second shackle is adapted to be oriented between the first spring pin and the second spring pin, wherein when in the assembled state, the flattened end of the first spring pin that extends beyond a second side of the leaf spring is seated in the seating portion at one end of the second shackle and the flattened end of the second spring pin that extends beyond a corresponding side of the suspension bracket is seated in the seating portion at the other end of the second shackle; and
- at least two fastening members, each fastening member mounted through the cylindrical hole passing through the longitudinal axis of a corresponding shackle, wherein each fastening member secures the first spring pin and the second spring pin to the corresponding shackle.

13. An apparatus for rotatably attaching one end of a leaf spring to a suspension bracket in accordance with claim 12, wherein the seating portions of each shackle form U-shaped open ends with the open portions of each U-shaped open end directed away from the central body portion.

14. An apparatus for rotatably attaching one end of a leaf spring to a suspension bracket in accordance with claim 12, wherein the seating portions of each shackle form O-shaped ends.

15. An apparatus for rotatably attaching one end of a leaf spring to a suspension bracket in accordance with claim 12, wherein the seating portions of each shackle form square-shaped ends.

16. An apparatus for rotatably attaching one end of a leaf spring to a suspension bracket, the apparatus comprising:
- a first spring pin and a second spring pin, each spring pin having a cylindrical center portion and two flattened ends symmetrical about the cylindrical center portion, each flattened end having a transverse hole therethrough;

a first shackle and a second shackle, each shackle having a central body portion, two U-shaped portions on opposite ends of the central body portion with the open-ended side of each U-shaped portion directed away from the central body portion, and a cylindrical hole along a longitudinal axis passing through the central body portion and each U-shaped portion of the shackle;

the first spring pin is rotatably mountable to a leaf spring such that the flattened ends of the first spring pin extend beyond opposing sides of the leaf spring;

the second spring pin is rotatably mountable to a suspension bracket such that the flattened ends of the second spring pin extend beyond opposing sides of the suspension bracket;

the first shackle is adapted to be oriented between the first spring pin and the second spring pin, wherein when in an assembled state, the flattened end of the first spring pin that extends beyond a first side of the leaf spring is seated in the U-shaped portion at one end of the first shackle and the flattened end of the second spring pin that extends beyond a corresponding side of the suspension bracket is seated in the U-shaped portion at the other end of the first shackle;

the second shackle is adapted to be oriented between the first spring pin and the second spring pin, wherein when in an assembled state, the flattened end of the first spring pin that extends beyond a second side of the leaf spring is seated in the U-shaped portion at one end of the second shackle and the flattened end of the second spring pin that extends beyond a corresponding side of the suspension bracket is seated in the U-shaped portion at the other end of the second shackle; and at least two fastening members, each fastening member mounted through the cylindrical hole passing through the longitudinal axis of a corresponding shackle, wherein each fastening member secures the first spring pin and the second spring pin to the corresponding shackle.

17. An apparatus for mounting a suspension system, the apparatus comprising:

a front bracket;

a rear bracket;

a leaf spring attached between the front bracket and the rear bracket, the leaf spring having a looped front end and a looped rear end;

at least three spring pins, each spring pin having a cylindrical center portion and two flattened ends symmetrical about the cylindrical center portion, and each flattened end having a transverse hole therethrough;

at least two shackles, each shackle having a central body portion, two open-ended U-shaped portions on opposite ends of the central body portion with the open-ended side of each U-shaped portion directed away from the central body portion, and a cylindrical hole passing through the length of the shackle;

the looped front end of the leaf spring being rotatably attached to the front bracket by aligning a first spring pin through the looped front end and securing each flattened end of the first spring pin to the front bracket; and the looped rear end of the leaf spring being attached to the rear bracket in a double rotatable configuration by:
aligning a second spring pin through the looped rear end,
aligning a third spring pin through the rear bracket,
mounting a first shackle between corresponding flattened ends of the second spring pin and the third spring pin located on one side of the leaf spring,
mounting a second shackle between corresponding flattened ends of the second spring pin and the third spring pin located on another side of the leaf spring, and
securing each shackle to the corresponding flattened ends of the second spring pin and the third spring pin using a single fastening bolt for each shackle.

18. A vehicle having at least one axle, the vehicle comprising:

a frame having attached thereto a front bracket and a rear bracket;

a leaf spring suspension system, said leaf spring having a looped front end, a looped rear end, and a structure adapted to engage the at least one axle;

three spring pins, each spring pin having a cylindrical center portion and two flattened ends symmetrical about the cylindrical center portion, and each flattened end having a transverse hole therethrough;

two shackles, each shackle having a central body portion, two open-ended U-shaped portions on opposite ends of the central body portion with the open-ended side of each U-shaped portion directed away from the central body portion, and a cylindrical hole passing through the length of the shackle;

the looped front end of the leaf spring being rotatably attached to the front bracket by aligning a first spring pin through the looped front end and securing each flattened end of the first spring pin to the front bracket by threading one fastening member through the transverse hole in each flattened end; and the looped rear end of the leaf spring being attached to the rear bracket in a double rotatable configuration by aligning a second spring pin through the looped rear end, aligning a third spring pin through the rear bracket, mounting and securing a first shackle between corresponding flattened ends of the second spring pin and the third spring pin located on one side of the leaf spring by threading one fastening member through the cylindrical hole in the first shackle and the transverse holes in the corresponding flattened ends of the second spring pin and the third spring pin, and mounting and securing a second shackle between corresponding flattened ends of the second spring pin and the third spring pin located on another side of the leaf spring by threading one fastening member through the cylindrical hole in the second shackle and the transverse holes in the corresponding flattened ends of the second spring pin and the third spring pin.

19. A method of mounting a suspension system to a frame that will be subjected to mechanical vibrations, the method comprising:

providing a front bracket, a rear bracket, and a leaf spring having a front end and a rear end;

providing three spring pins, two shackles, two front fasteners, and two rear fasteners;

rotatably attaching the front end of the leaf spring to the front bracket by rotatably mounting a first spring pin to the front end of the leaf spring and securing opposing ends of the first spring pin to the front bracket with the two front fasteners; and rotatably attaching the rear end of the leaf spring to the rear bracket with a double rotatable connection having two parallel axes of rotation by:

rotatably mounting a second spring pin to the rear end of the leaf spring;

rotatably mounting a third spring pin to the rear bracket;

linking a first end of the second spring pin with a first end of the third spring pin using a first shackle;

linking a second end of the second spring pin with a second end of the third spring pin using a second shackle; and securing the first end of the second spring pin, the first end of the third spring, and the first shackle using a first rear fastener, and securing the second end of the second spring pin, the second end of the third spring pin, and the second shackle using a second rear fastener.

20. A method of mounting a suspension system in accordance with claim 19, the method further comprising:

providing each spring pin with two ends, each end having a transverse hole therethrough;

providing each shackle with a longitudinal axis and a cylindrical hole along the longitudinal axis;

securing the first ends of the second spring pin and the third spring pin with the first shackle by inserting the first rear fastener through the cylindrical hole along the longitudinal axis of the first shackle and through the corresponding transverse holes through the first ends of the second spring pin and the third spring pin; and securing the second ends of the second spring pin and the third spring pin with the second shackle by inserting the second rear fastener through the cylindrical hole along the longitudinal axis of the second shackle and through the corresponding transverse holes through the second ends of the second spring pin and the third spring pin.

21. An apparatus for rotatably attaching one end of a leaf spring to a suspension bracket, the apparatus comprising:

first and second spring pins, each of the spring pins having two ends, and each of the ends having a transverse hole therethrough;

first and second shackles, each of the shackles having a cylindrical hole along a longitudinal axis;

the first spring pin is rotatably mountable to a leaf spring and the second spring pin is rotatably mountable to a suspension bracket;

the first shackle is adapted to be oriented on a first side of the leaf spring and between the first spring pin and the second spring pin;

the second shackle is adapted to be oriented on a second side of the leaf spring and between the first spring pin and the second spring pin; and first and second fastening members, the first fastening member being mountable through the cylindrical hole along the longitudinal axis of the first shackle and securable to the first spring pin and the second spring pin, and the second fastening member being mountable through the cylindrical hole along the longitudinal axis of the second shackle and securable to the first spring pin and the second spring pin.

\* \* \* \* \*

UNITED STATES PATENT AND TRADEMARK OFFICE
CERTIFICATE OF CORRECTION

PATENT NO. : 6,209,897 B1
DATED : April 3, 2001
INVENTOR(S) : Robert L. Bundy et al.

It is certified that error appears in the above-identified patent and that said Letters Patent is hereby corrected as shown below:

Column 5,
Line 4, after "28", insert --. --.

Column 12,
Line 12, after "A vehicle", delete "having at least one axle, the vehicle".
Line 18, after "engage", delete "the".

Signed and Sealed this

Ninth Day of October, 2001

*Attest:*

*Attesting Officer*

NICHOLAS P. GODICI
*Acting Director of the United States Patent and Trademark Office*